US011955743B2

(12) United States Patent
Hsu et al.

(10) Patent No.: US 11,955,743 B2
(45) Date of Patent: Apr. 9, 2024

(54) CONNECTION MODULE AND THINNING METHOD THEREOF

(71) Applicant: Getac Technology Corporation, New Taipei (TW)

(72) Inventors: Wan-Lin Hsu, Taipei (TW); Juei-Chi Chang, Taipei (TW)

(73) Assignee: GETAC TECHNOLOGY CORPORATION, New Taipei (TW)

( * ) Notice: Subject to any disclaimer, the term of this patent is extended or adjusted under 35 U.S.C. 154(b) by 153 days.

(21) Appl. No.: 17/589,296

(22) Filed: Jan. 31, 2022

(65) Prior Publication Data

US 2023/0246363 A1 Aug. 3, 2023

(51) Int. Cl.

*H01R 12/72* (2011.01)
*H01R 12/70* (2011.01)
*H01R 12/73* (2011.01)

(52) U.S. Cl.

CPC ....... *H01R 12/724* (2013.01); *H01R 12/7047* (2013.01); *H01R 12/732* (2013.01)

(58) Field of Classification Search

CPC .... H01R 12/724; H01R 12/91; H01R 12/523; H01R 12/752; H01R 12/62; H01R 12/722; H01R 12/732; H01R 12/7047; H01R 12/79

USPC ....................................... 439/660, 74, 67, 69

See application file for complete search history.

(56) References Cited

U.S. PATENT DOCUMENTS 2,025,619 A * 12/1935 Scotney .................. H05K 7/06 361/803
5,362,243 A * 11/1994 Huss .................... H05K 9/0066 361/749
6,368,116 B1 * 4/2002 Tabata .................. H01R 12/79 439/493
6,595,786 B2 * 7/2003 Horiuchi ............ H01R 13/6315 439/74
6,935,868 B1 * 8/2005 Campini ................ G06F 1/186 361/748

(Continued)

FOREIGN PATENT DOCUMENTS

CN 113365452 A * 9/2021

OTHER PUBLICATIONS

European Patent Office, Search Report, dated Jun. 14, 2023, Germany.

*Primary Examiner* — Marcus E Harcum
(74) *Attorney, Agent, or Firm* — Locke Lord LLP; Tim Tingkang Xia, Esq.

(57) ABSTRACT

A connection module is disposed in a main circuit board and includes a card edge connector, a hard circuit board and two connectors. The card edge connector is fixedly disposed on the main circuit board. The hard circuit board has a board body and a connecting tongue for correspondingly plugging with the card edge connector. The board body is configured with a disconnecting notch, and the board body is separated by the disconnecting notch into two floating plates arranged side by side at an interval and floatable using the disconnecting notch. The connectors are respectively fixed to the floating plates. Thus, without needing an additional guide frame, the connectors are enabled to float in any desired direction, thereby achieving effects of reducing an overall height and satisfying current thinning requirements.

14 Claims, 10 Drawing Sheets

(56) References Cited

U.S. PATENT DOCUMENTS

| | | | | |
|---|---|---|---|---|
| 7,252,516 | B1 * | 8/2007 | Zhang | G06F 1/1658 439/67 |
| 7,649,751 | B2 * | 1/2010 | Nguyen | H01R 12/7005 361/752 |
| 7,740,489 | B2 * | 6/2010 | Trout | H01R 12/523 439/74 |
| 8,308,491 | B2 * | 11/2012 | Nichols | H01R 12/73 439/67 |
| 10,038,262 | B1 * | 7/2018 | Behziz | H01R 12/7082 |
| 10,095,280 | B2 * | 10/2018 | Bettiga | G06F 1/185 |
| 10,454,194 | B1 | 10/2019 | Phillips et al. | |
| 10,547,134 | B1 * | 1/2020 | Lee | H01R 24/60 |
| 10,566,722 | B2 * | 2/2020 | Lee | H01R 12/62 |
| 11,316,290 | B2 * | 4/2022 | Kliever | H01R 12/523 |
| 2002/0072255 | A1 * | 6/2002 | Leman | H01R 12/721 439/61 |
| 2005/0170675 | A1 | 8/2005 | Takada | |
| 2011/0249419 | A1 * | 10/2011 | Sun | H01R 12/7082 361/803 |
| 2013/0005193 | A1 | 1/2013 | Tsai | |
| 2015/0194768 | A1 * | 7/2015 | Little | H01R 24/60 439/607.37 |
| 2017/0099735 | A1 * | 4/2017 | Takai | H05K 9/0058 |
| 2018/0138646 | A1 * | 5/2018 | Chuang | H05K 1/117 |
| 2020/0028292 | A1 | 1/2020 | Lee et al. | |
| 2021/0376527 | A1 | 12/2021 | Cheng et al. | |
| 2022/0181811 | A1 * | 6/2022 | Liu | H01R 13/6272 |

* cited by examiner

CONNECTION MODULE AND THINNING METHOD THEREOF

BACKGROUND OF THE INVENTION

Field of the Invention

The present invention relates to an electrical connection structure and, more particularly, to a connection module and a thinning method thereof.

Description of the Prior Art

Connectors disposed on circuit boards and pluggable devices plugged to connectors suffer from a drawback of the incapability of effectively improving transmission speeds. Thus, in order to improve the transmission speed, the Inventor of the present invention plans to provide at the same time a plurality of (two or more) counterpart connectors on a pluggable device, and to correspondingly provide at the same time a plurality of (two or more) connectors on a circuit board. Although the approach above achieves the object of improving the transmission speed, another issue of the need for precise alignment between the connectors and the counterpart connectors is also induced.

To enable precise alignment between the connectors and the counterpart connectors, a current approach is to use a flexible circuit board for disposing the connectors, such that the connectors are allowed to float along with the flexible circuit board by means of the flexibility of the flexible circuit board.

The current approach of using such flexible circuit board achieves the effect of precise alignment required. However, a guide frame is additionally needed in practice to guide the floating, resulting in an increased overall height and hence a failure in satisfying current thinning requirements.

SUMMARY OF THE INVENTION

It is an object of the present invention to provide a connection module and a thinning method thereof.

To achieve the object above, the present invention provides a connection module disposed on a main circuit board. The connection module includes: a card edge connector, disposed stationarily on the main circuit board; a hard circuit board, having a board body and a connecting tongue for correspondingly plugging with the card edge connector, wherein the board body is provided with at least one disconnecting notch, and the board body is separated by the disconnecting notch into two floating plates arranged side by side at an interval and floatable using the disconnecting notch; and at least two connectors, respectively fixed to the floating plates.

The prevent invention further provides a thinning method for a connection module provided on a main circuit board. The thinning method includes: providing a card edge connector, the card edge connector disposed stationarily on the main circuit board; providing a hard circuit board, the hard circuit board having a board body and a connecting tongue; configuring a disconnecting notch, the disconnecting notch configured at the board body, wherein the board body is separated by the disconnecting notch into two floating plates arranged side by side at an interval and floatable using the disconnecting notch; and providing at least two connectors, the connectors respectively fixed to the floating plates; wherein, the hard circuit board is correspondingly plugged with the card edge connector by the connecting tongue.

Compared to the prior art, the present invention achieves the following effects. Using the connection module having a special design, without needing an additional guide frame, the connectors are enabled to float in any desired direction and two counterpart connectors are allowed to be precisely plugged at the same time, thereby achieving effects of reducing an overall height and satisfying thinning requirements.

DETAILED DESCRIPTION OF THE EMBODIMENTS

Details and technical contents of the present invention are described with the accompanying drawings below. It should be noted that the accompanying drawings are only for reference and illustration purposes and are not to be construed as limitations to the present invention.

Figure 6:
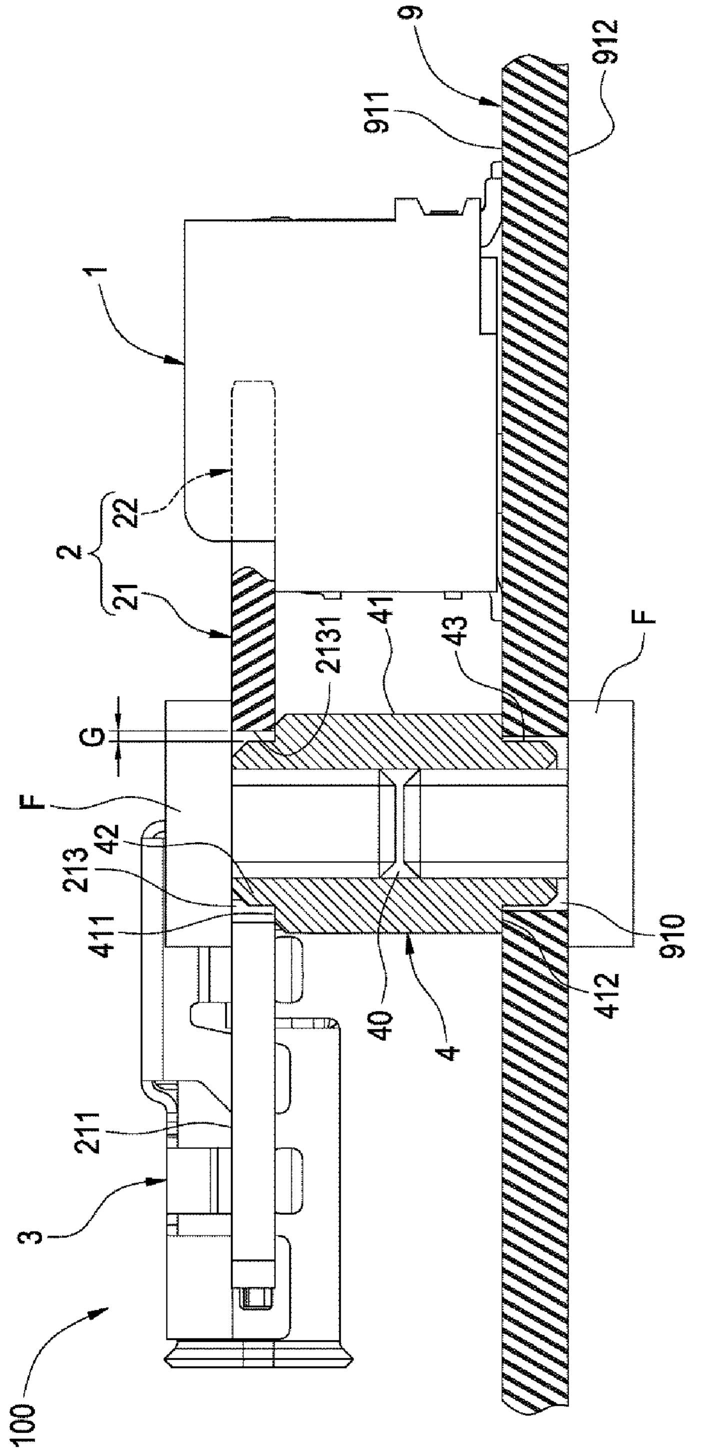
FIG. 6 is a cross-sectional schematic diagram of a connection module of the present invention.
Figure 7:
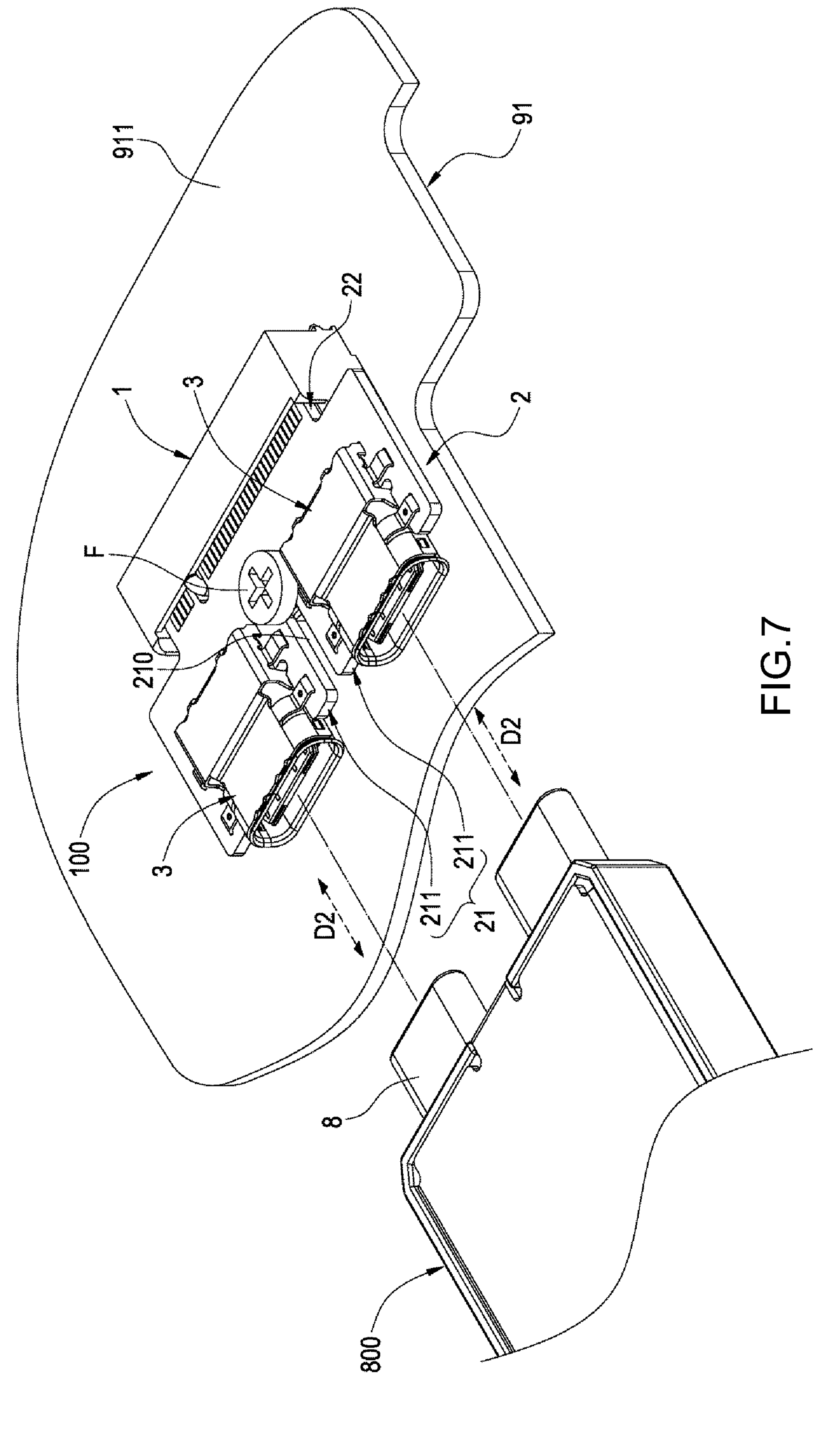
FIG. 7 is a three-dimensional diagram of a connection module of the present invention before plugged to a pluggable device.
Figure 8:
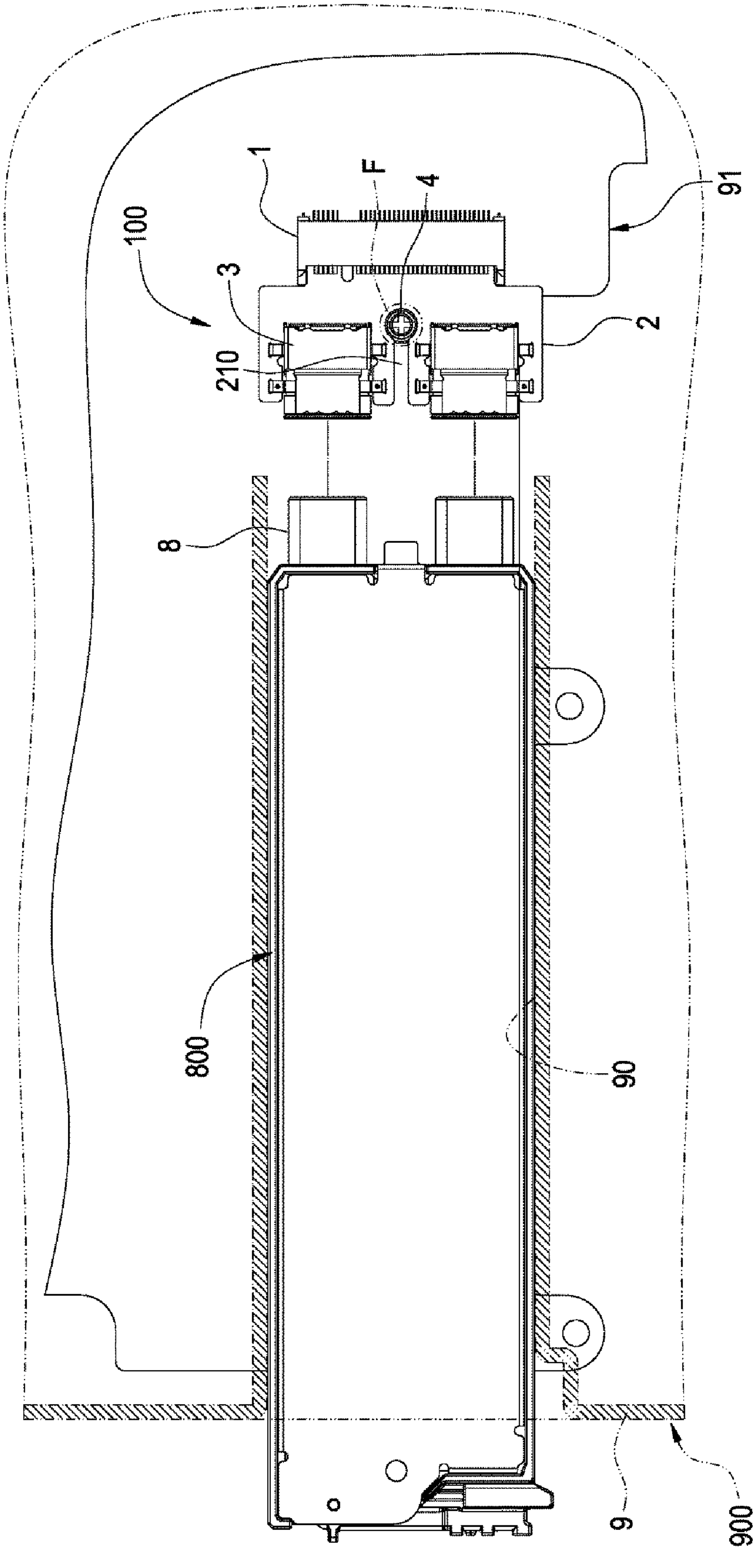
FIG. 8 is a cross-sectional diagram of a connection module of the present invention applied to an electronic product and before plugged to a pluggable device.
Figure 9:
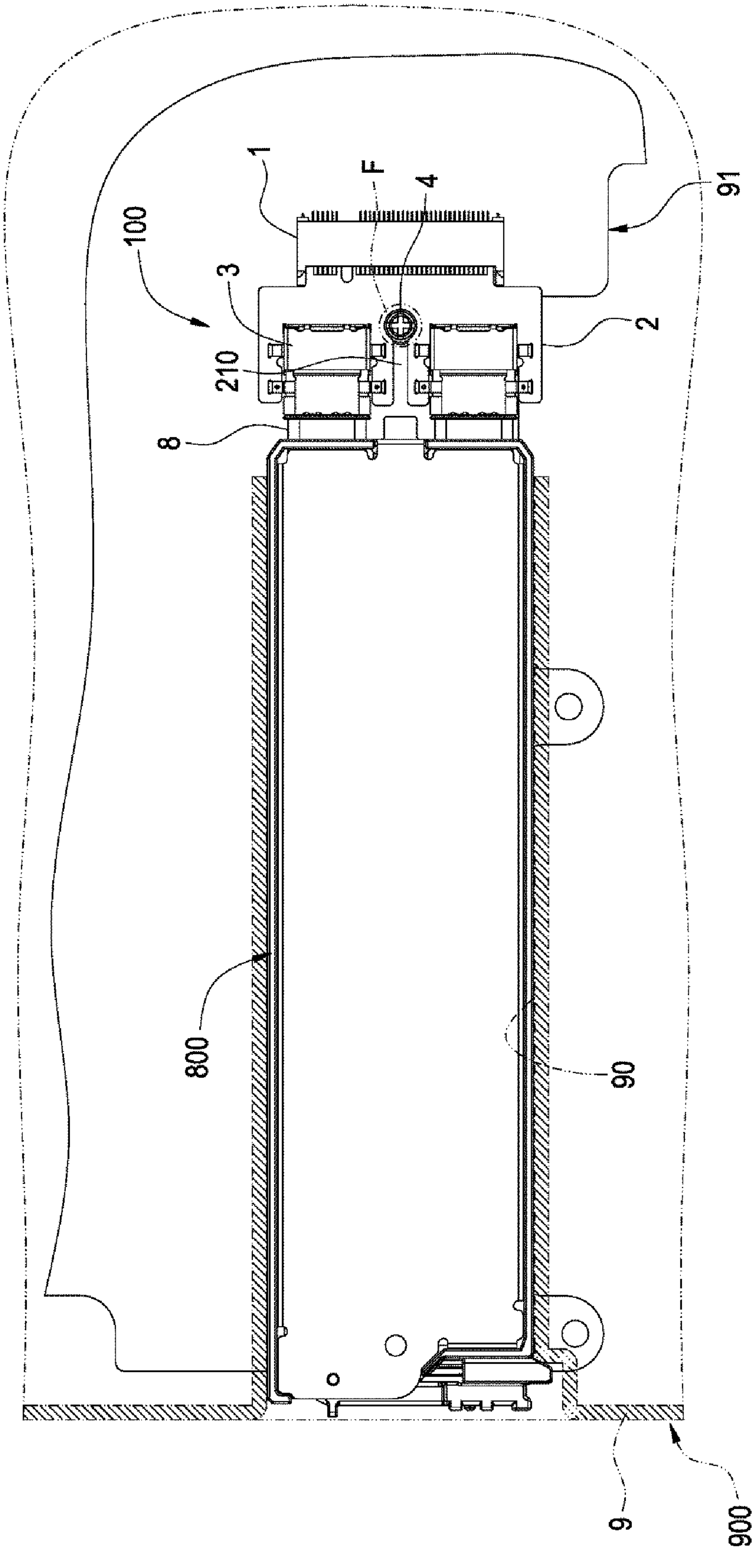
FIG. 9 is a cross-sectional diagram of the connection module in FIG. 8 after plugged to a pluggable device according to the present invention.
Figure 10:
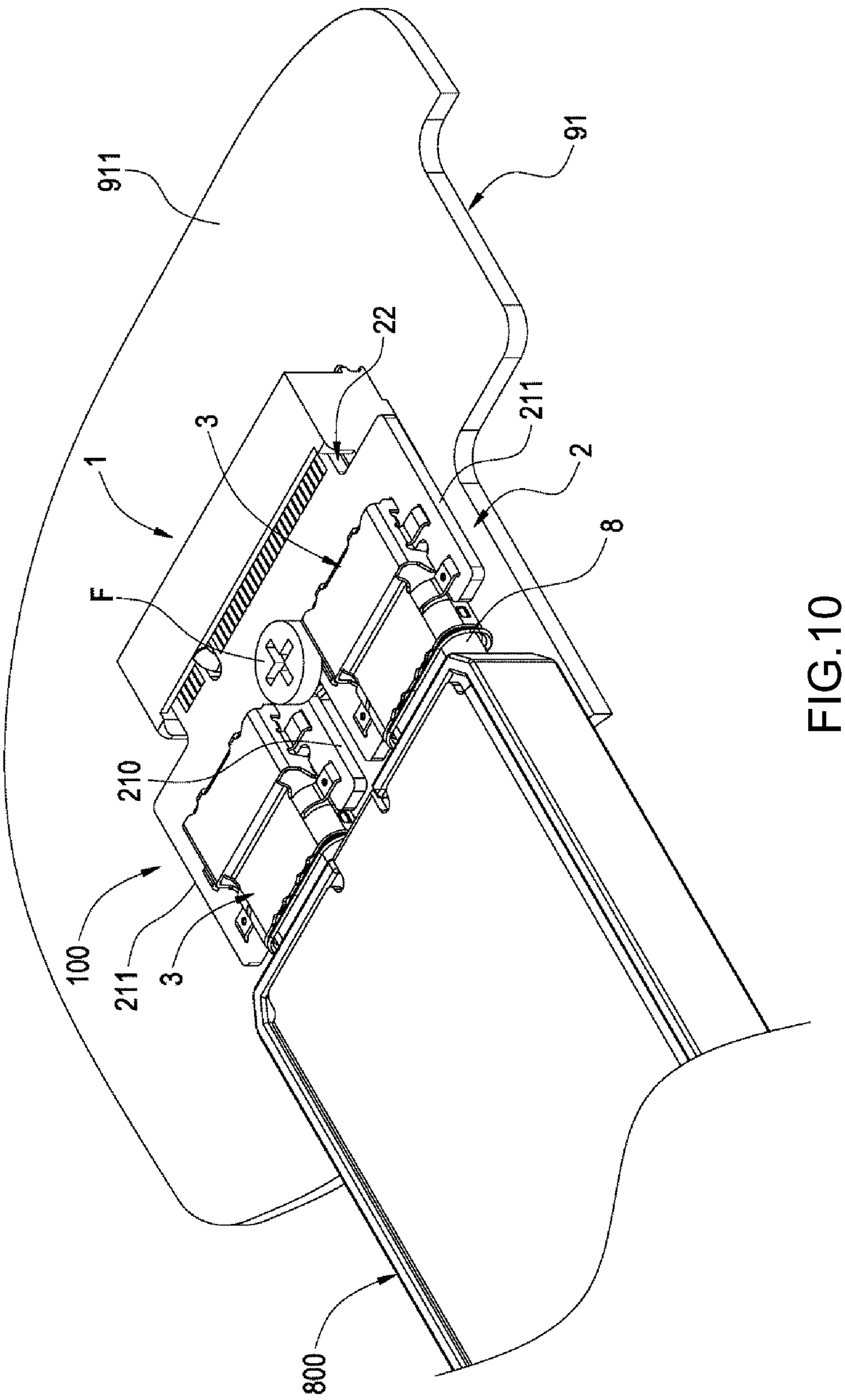
FIG. 10 is a three-dimensional diagram of the connection module in FIG. 7 after plugged to a pluggable device according to the present invention.

The present invention provides a connection module and a thinning method thereof. As shown in FIG. 7 and FIG. 8, a connection module of the present invention (to be simply referred to as a connection module 100) may be externally connected to outside an electronic product 900 and be used accordingly (not shown), or may be installed inside the electronic product 900 and be used accordingly; the present invention does not impose limitations thereon. The electronic device 900 includes a housing 9, a main circuit board 91 is disposed in the housing 9, and the main circuit board 91 has a first mounting surface 911 and a second mounting surface 912 opposite to each other, as shown in FIG. 6. Moreover, the housing 9 may be further provided with a guide slot 90 corresponding to the connection module 100, so as to guide and plug with a pluggable device 800 using the guide slot 90.

Figure 1:
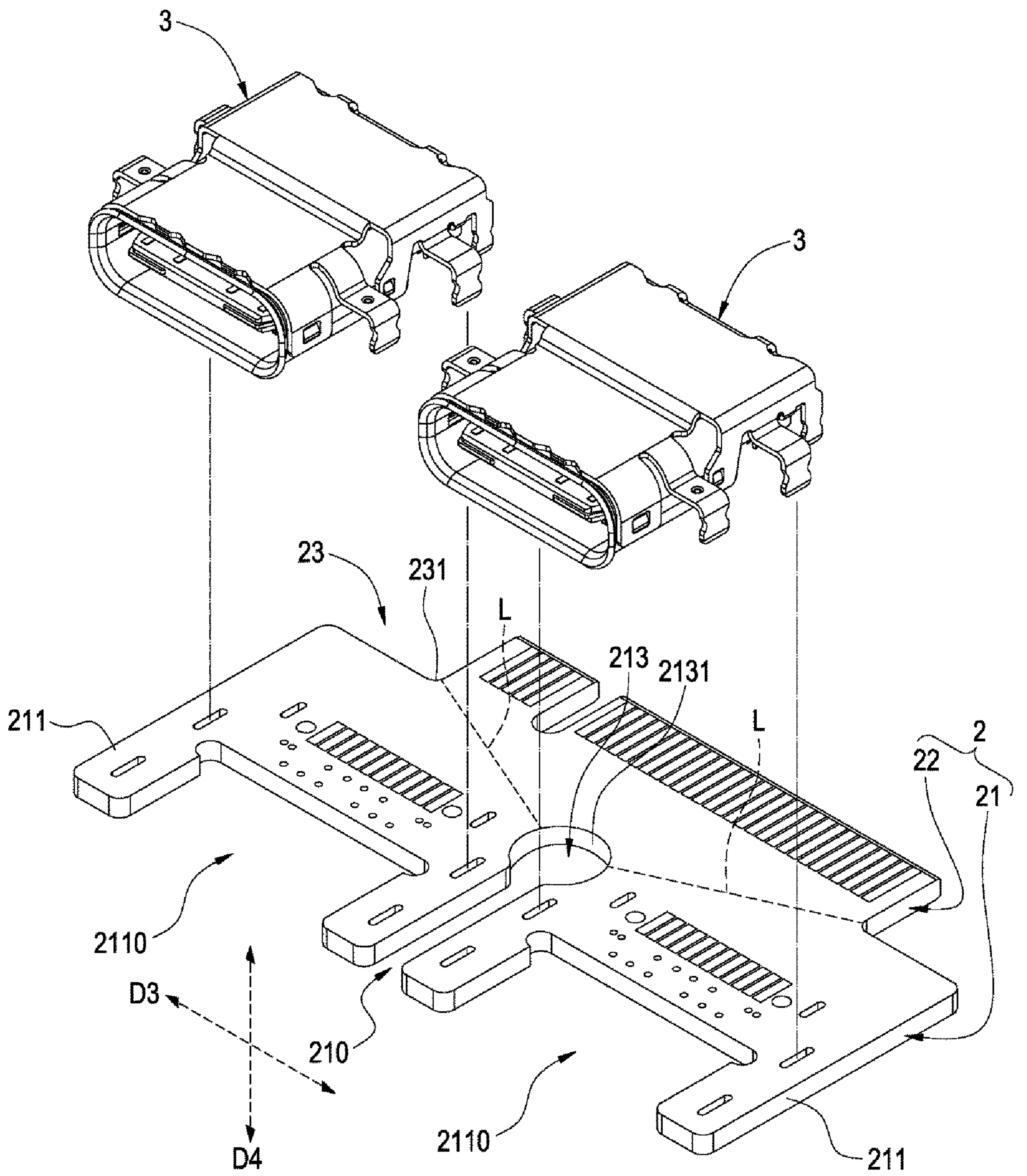
FIG. 1 is a three-dimensional exploded diagram of a hard circuit board and connectors in a connection module of the present invention.
Figure 2:
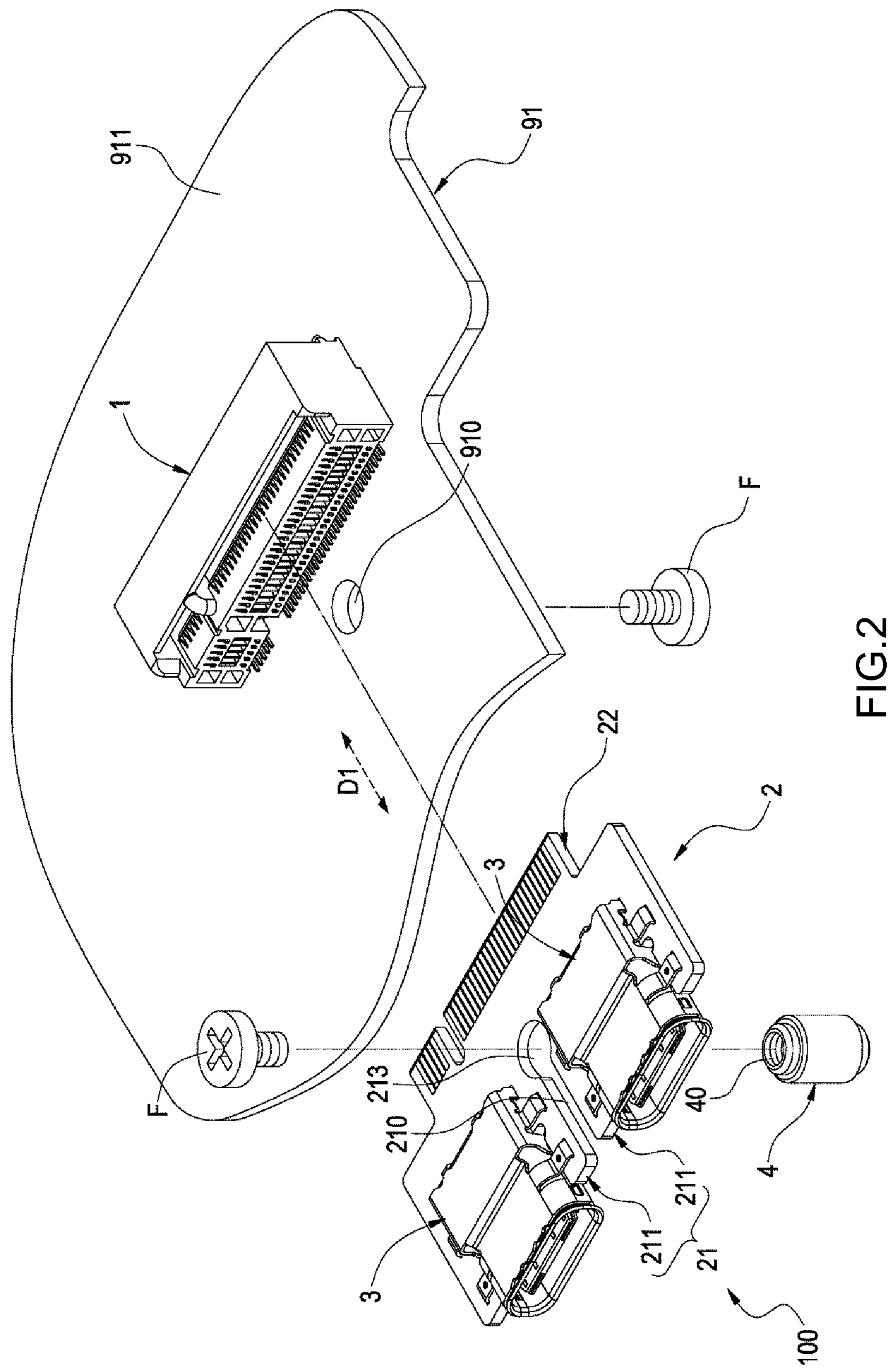
FIG. 2 is a three-dimensional exploded diagram of most of a connection module of the present invention.
Figure 5:
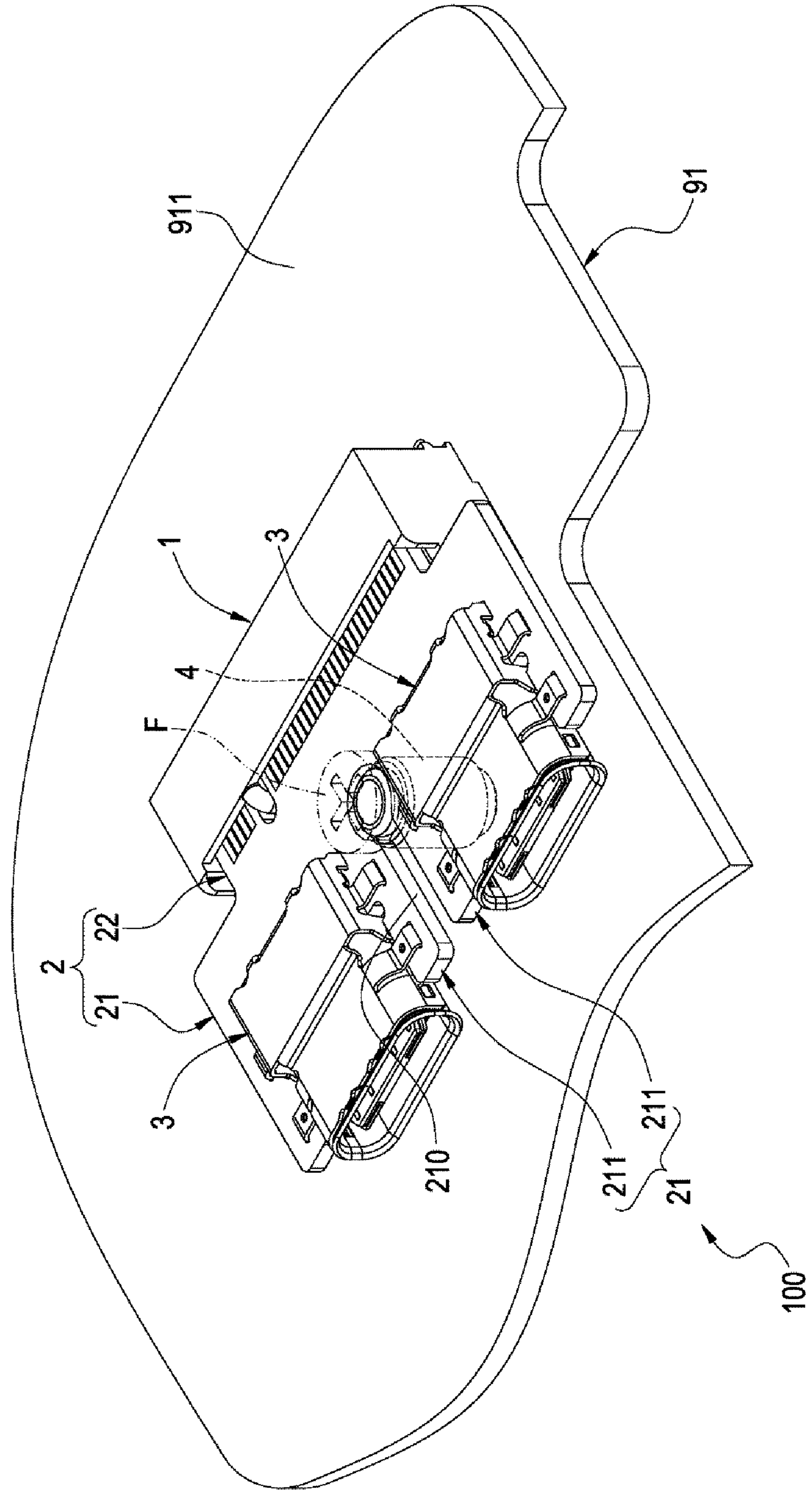
FIG. 5 is a three-dimensional assembly diagram of FIG. 2 according to the present invention.

As shown in FIG. 1, FIG. 2 and FIG. 5, the connection module 100 of the present invention is disposed on the main circuit board 91 and includes a card edge connector 1, a hard circuit board 2 and at least two connectors 3, and preferably includes a fixing column 4.

As shown in FIG. 1, FIG. 2 and FIG. 5, the card edge connector 1 is disposed flat and stationarily on a mounting surface (may be any one of the first and second mounting surfaces 911 and 912 above, and is the first mounting surface 911 in this embodiment) of the main circuit board 91, such that the card edge connector 1 is defined with a first plugging direction D1, wherein the first plugging direction D1 and the first mounting surface 911 of the main circuit board 91 are parallel to each other. The card edge connector 1 is preferably an M.2 connector.

Figure 3:
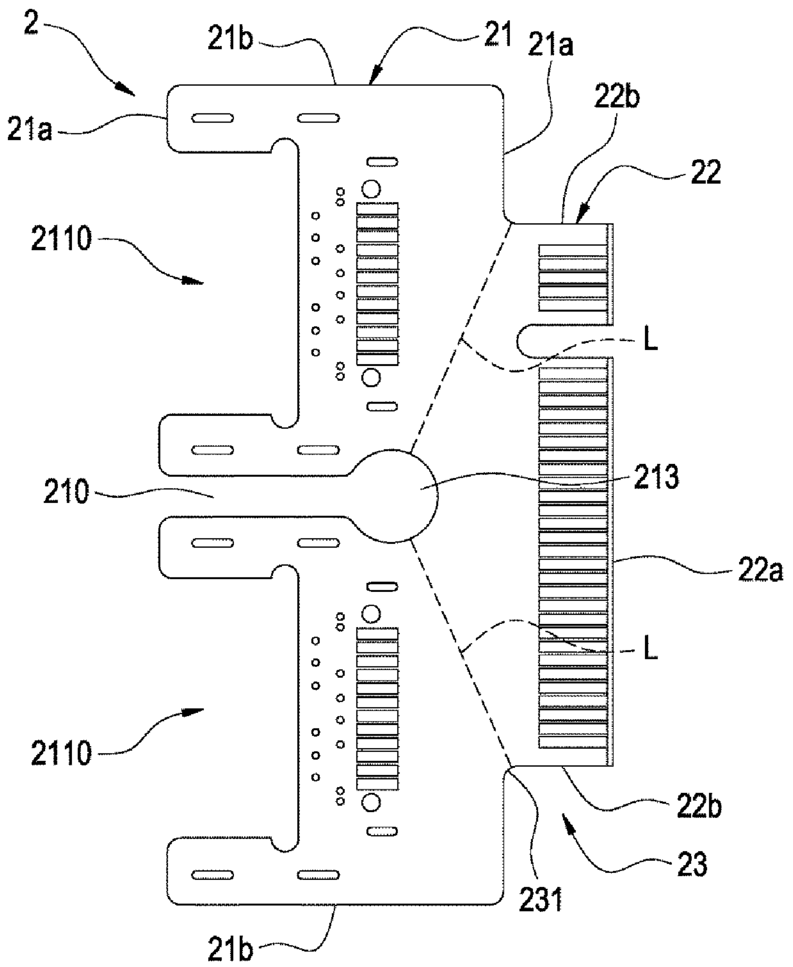
FIG. 3 is a planar schematic diagram of a hard circuit board in FIG. 1 according to the present invention.

As shown in FIG. 1 to FIG. 3, the hard circuit board 2 includes a board body 21 and a connecting tongue 22. The board body 21 has two long sides 21*a* opposite to each other and two short sides 21*b* opposite to each other. The connecting tongue 22 extends integrally from one of the long sides 21*a* of the board body 21 and is for pluggably plugging in the card edge connector 1 in the first plugging direction D1. The hard circuit board 2 is capable of only plugging with the card edge connector 1 by the connecting tongue 22 so as to be fixed with the main circuit board 91, or may be fixed further by other means (to be described in detail later). The connecting tongue 22 similarly has two long sides 22*a* opposite to each other and two short sides 22*b* opposite to each other. One of the long sides 22*a* of the connecting tongue 22 adjoins one of the long sides 21*a* of the board body 21 in a side-by-side manner.

At least one disconnecting notch 210 shaped as a breach is provided on any side of the board body 21, and the number of the disconnecting notch 210 may be one or two or more. In this embodiment, one disconnecting notch 210 provided on the other long side 21*a* of the board body 21 is used as an example for illustration. Thus, the board body 21 is separated by the disconnecting notch 210 into two floating plates 211 arranged side by side at an interval, and the two floating plates 211 are floatable in any desired direction using the disconnecting notch 210. As shown in FIG. 1, the hard circuit board 2 is defined with a side-by-side direction D3 (a direction in which the two floating plates 211 are arranged side by side) and a top-down direction D4, wherein the side-by-side direction D3 and the top-down direction D4 are perpendicular to each other. Each of the floating plates 211 is floatable in any desired direction, that is, floatable in the side-by-side direction D3 and/or the top-down direction D4 (the side-by-side direction D3, the top-down direction D4, or the side-by-side direction D3 and the top-down direction D4).

The number of the connectors 3 is not limited by the present invention, and may be two or three or more; a corresponding number of the connectors 3 is needed according to the number of floating plates 211 of the board body 21. In this embodiment, two connectors 3 are respectively fixed to the two floating plates 211 as an example for illustration.

A structure for fixing the connector 3 to the floating plate 211 may be any fixing structure as desired, and in this embodiment, a sunken plate structure is taken as an example for illustration. That is, each floating plate 211 is provided with a sunken plate opening 2110, so as to embed each connector 3 by a sunken plate means into each sunken plate opening 2110 and fix each connector 3 to each floating plate 211, thereby providing an effect of reducing the overall height. The position for providing each sunken plate opening 2110 may also be on the other long side 21*a* of the board body 21. As shown in FIG. 7, each of the connectors 3 is defined with a second plugging direction D2 for plugging of the pluggable device 800, and the first plugging direction D1 and the second plugging direction D2 are parallel to each other. In other words, both the hard circuit board 2 and the pluggable device 800 are plugged in a direction parallel to the direction of the first mounting surface 911 of the main circuit board 91, but are not plugged in a perpendicular direction, hence also providing an effect of reducing the overall height. The connector 3 is preferably a USB Type-C connector.

Accordingly, as shown in FIG. 5 to FIG. 10, the hard circuit board 2 has two floating plates 211 formed thereon by means of the disconnecting notch 210, and the two connectors 3 are respectively arranged on the two floating plates 211. Thus, when two counterpart connectors 8 of the pluggable device 800 are simultaneously pluggably plugged with the two connectors 3 of the connection module 100 of the present invention in the second plugging direction D2, even if the two connectors 3 and the two counterpart connectors 8 are not precisely aligned, the two counterpart connectors 8 can still be simultaneously precisely plugged in the two connectors 3 since the two connectors 3 are floatable in any desired direction along with the two floating plates 211. In other words, using the connection module 100 having a special design of the present invention, without needing an additional guide frame, the connectors 3 are enabled to float in any desired direction along with the floating plates 211 and the two counterpart connectors 8 are allowed to be simultaneously precisely plugged, thereby achieving effects of reducing the overall height and satisfying current thinning requirements. It should be noted that such effects can be achieved in coordination with: 1) embedding the connectors 3 respectively into the sunken plate openings 2110 by a sunken plate means, and 2) using the card edge connector 1 to allow both the hard circuit board 2 and the pluggable device 800 to be plugged in a direction parallel to the first mounting surface 911 of the main circuit board 91.

In addition to fixing the hard circuit board 2 to the main circuit board 91 by plugging in the card edge connector 1, a through hole 213 may be further provided so that the hard circuit board 2 may be fixed to the main circuit board 91 by a fixing element F via the through hole 213. The through hole 213 may be provided at the board body 21 or the connecting tongue 22, and is provided at the board body 21 in this embodiment as an example for illustration. The through hole 213 may be in communication with the disconnecting notch 210 as shown in the drawings, or may not be in communication therewith (not shown). In this embodiment, the through hole 213 is connected to and is in communication with the disconnecting notch 210 as an example for illustration, so as to reduce the distance between the through hole 213 and the disconnecting notch 210 and to minimize the area of the board body 21 (or reduce the area of the hard circuit board 2).

The hard circuit board 2 may be fixed to the main circuit board 91 by the fixing element F via the through hole 213 only, preferably, the fixing element F is further fixed via the fixing column 4, as shown in FIG. 2 to FIG. 6. The fixing column 4 is erected on the first mounting surface 911 of the main circuit board 91, and has a fixing hole 40, and the fixing element F is secured at the fixing hole 40 via the through hole 213, thereby clamping and securing the hard circuit board 2 between the fixing element F and the fixing column 4.

Figure 4:
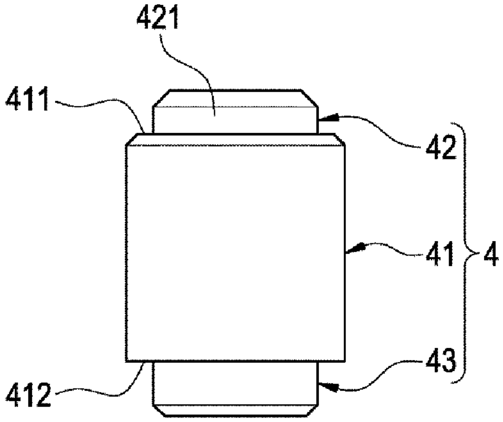
FIG. 4 is a planar schematic diagram of a fixing column in FIG. 2 according to the present invention.

More specifically, as shown in FIG. 4 as well as FIG. 3, FIG. 5 and FIG. 6, the fixing column 4 has a large diameter portion 41 and two small diameter portions 42 and 43 respectively protruding from two ends of the large diameter portion 41. Two flanges 411 and 412 having step difference shapes are formed respectively between the small diameter portions 42 and 43 and the large diameter portion 41, and the main circuit board 91 is provided with a fixing hole 910. The two small diameter portions 42 and 43 are respectively inserted correspondingly into the through hole 213 and the fixing hole 910, and the two fixing elements F respectively pass through the through hole 213 and the fixing hole 910 and are respectively fixed in the fixing holes 40 on the two ends of the fixing column 4, such that the hard circuit board 2 is clamped and secured between the fixing element F and the flange 411 of the fixing column 4, that is, enabling the fixing column 4 to support the hard circuit board 2 by the flange 411. Furthermore, the main circuit board 91 is clamped and secured between the flange 412 of the fixing column 4 and the fixing element F, so as to enable the fixing column 4 to be supported on the first mounting surface 911 of the main circuit board 91 by the flange 412.

Referring to FIG. 6 as well as FIG. 4 and FIG. 5, the through hole 213 of the hard circuit board 2 has an inner periphery 2131, the small diameter portion 42 of the fixing column 4 has an outer periphery, and the inner periphery 2131 and the outer periphery 421 are spaced by a gap G formed in between (referring to FIG. 6). Thus, each of the floating plates 211 is floatable in any desired direction via the disconnecting notch 210 and the gap P, and in particular, each of the floating plates 211 is floatable in the side-by-side direction D3.

The through hole 213 above may be in communication with any portion of the disconnecting notch 210, and is in communication with an inner end of the disconnecting notch 210 in this embodiment as an example for illustration, such that the through hole 213 becomes a notch bottom of the disconnecting notch 210. In other embodiments not shown in the drawings, if the through hole 213 is not in communication with the disconnecting notch 210, the inner end of the disconnecting notch 210 is the notch bottom.

To enhance the floating ability of each of the floating plates 211 in the top-down direction D4, as shown in FIG. 1 and FIG. 3, the length of the connecting tongue 22 is designed to be less than the length of the board body 21, so that two concave portions 23 of the hard circuit board 2 are respectively formed between one long side 21*a* of the board body 21 and two short sides 22*b* of the connecting tongue 22. Using the concave portions 23, a distance L between the notch bottom of the disconnecting notch 210 and a concave portion inner corner 231 of each of the concave portions 23 is reduced for the floating plates 211, hence better helping the floating plates 211 to float in the top-down direction D4.

Moreover, as described above, in other embodiments not shown in the drawings, the hard circuit board 2 may be provided with two or more disconnecting notches 210, and each of the through hole 213 and the fixing column 4 is provided in singular form, for the reason that only one additional second fixing portion is needed in addition to fixing the hard circuit board 2 to the card edge connector 1 (a first fixing portion). The second fixing portion may be fixed by the fixing element F only, or the fixing element F may be fixed to the fixing column 4.

Figure 11:
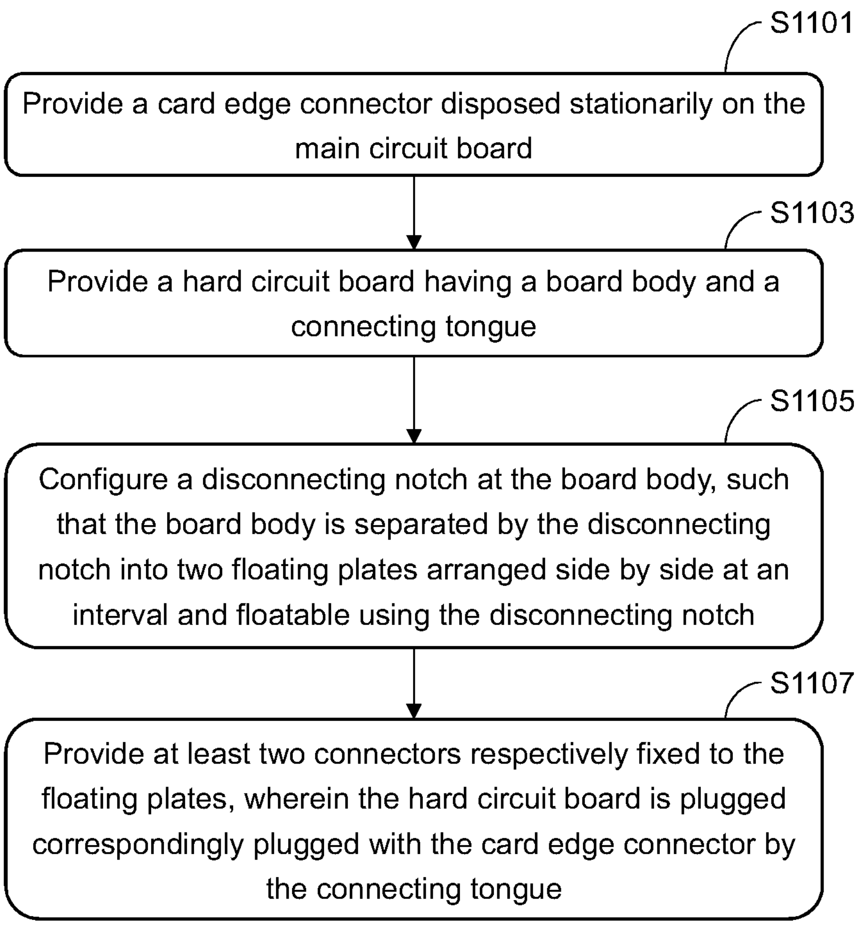
FIG. 11 is a flowchart of a thinning method of the present invention.

As shown in FIG. 11, a thinning method for a connection module of the present invention is applied to disposing the main circuit board 91, and includes: step S1101 of providing a card edge connector 1; step S1103 of providing a hard circuit board 2; step S1105 of configuring a disconnecting notch 210; and step S1107 of providing at least two connectors 3.

In step S1101 of providing a card edge connector 1, the card edge connector 1 is disposed stationarily on the first mounting surface 911 of the main circuit board 91. In step S1103 of providing a hard circuit board 2, the hard circuit board 2 has a board body 21 and a connecting tongue 22 protruding integrally from one of the long sides 21*a* of the board body 21. In step S1105 of configuring a disconnecting notch 210, the disconnecting notch 210 is configured at the board body 21, so that the board body 21 is separated by the disconnecting notch 210 into two floating plates 211 arranged side by side at an interval and the two floating plates 211 are floatable in any desired direction using the disconnecting notch 210. In step S1107 of providing two connectors 3, the connectors 3 are respectively fixed to the floating plates 211, such that the connectors 3 are floatable in any desired direction along with the floating plates 211. The hard circuit board 2 is correspondingly plugged with the card edge connector 1 by the connecting tongue 22 thereof.

Thus, using the connection module 100 having a special design of the present invention, without needing an additional guide frame, the connectors 3 are enabled to float in any desired direction along with the floating plates 211 and the two counterpart connectors 8 are allowed to be simultaneously precisely plugged, thereby achieving effects of reducing the overall height and satisfying current thinning requirements.

In conclusion, the connection module and the thinning method thereof of present invention are capable of achieving expected utilization objects and resolving drawbacks of the prior art, and thus the present invention completely meets the requirements of a patent application. Therefore, a patent application is filed accordingly, and granting the application with patent rights is respectfully requested to ensure rights of the Inventor.

The description above provides merely preferred feasible embodiments of the present invention and is not to be construed as limitations to the claim scope of the present invention. All equivalent structural variations made on the basis of the description and drawings of the present invention are to be encompassed within the scope of claims of the present invention.

What is claimed is:

1. A connection module, disposed on a main circuit board, comprising:

a card edge connector, disposed stationarily on the main circuit board;

a hard circuit board, having a board body and a connecting tongue correspondingly plugged with the card edge connector, the board body provided with at least one disconnecting notch, the board body separated by the disconnecting notch into two floating plates arranged side by side at an interval and floatable using the disconnecting notch;

a fixing column, arranged on the main circuit board and having a fixing hole; and at least two connectors, respectively fixed to the floating plates, wherein the hard circuit board is provided with a through hole, the hard circuit board is fixed to the main circuit board by a fixing element via the through hole, the fixing element is fixedly connected to the fixing hole via the through hole, and the hard circuit board is fixed between the fixing element and the fixing column.

2. The connection module according to claim 1, wherein the hard circuit board is fixed to the main circuit board.

3. The connection module according to claim 1, wherein the through hole is provided at the board body and is in communication with the disconnecting notch.

4. The connection module according to claim 1, wherein the fixing column has a small diameter portion, the small diameter portion is correspondingly inserted in the through hole and has an outer periphery, the through hole has an inner periphery and is in communication with the disconnecting notch, a gap is present between the inner periphery and the outer periphery, and the floating plates are floatable via the disconnecting notch and the gap.

5. The connection module according to claim 1, wherein the fixing column is correspondingly inserted in the through hole and has a flange formed thereon, and the fixing column supports the hard circuit board by the flange.

6. The connection module according to claim 1, wherein the hard circuit board is defined with a side-by-side direction and a top-down direction perpendicular to each other, and the floating plates are floatable in the side-by-side direction, the top-down direction, or the side-by-side direction and the top-down direction via the disconnecting notch.

7. The connection module according to claim 1, wherein the hard circuit board has two concave portions respectively formed between two short sides of the connecting tongue and a long side of the board body, and a distance between a notch bottom of the disconnecting notch and a concave portion inner corner of each of the concave portions is reduced for the floating plates with the use of the concave portions.

8. The connection module according to claim 1, wherein a length of the connecting tongue is less than a length of the board body.

9. The connection module according to claim 1, wherein the card edge connector is an M.2 connector.

10. The connection module according to claim 1, wherein each of the floating plates is provided with a sunken plate opening, and each of the connectors is embedded into each of the sunken plate opening.

11. The connection module according to claim 1, wherein each of the connectors is a USB Type-C connector.

12. The connection module according to claim 1, wherein the card edge connector is disposed flat on the main circuit board, the card edge connector is defined with a first plugging direction, the first plugging direction is parallel to a mounting surface of the main circuit board, and the hard circuit board is pluggably plugged with the card edge connector in the first plugging direction.

13. The connection module according to claim 12, wherein each of the connectors is defined with a second plugging direction, and each of the second plugging direction is parallel to the first plugging direction.

14. A thinning method for a connection module, the connection module arranged on a main circuit board, the thinning method comprising:

providing a card edge connector, the card edge connector disposed stationarily on the main circuit board;

providing a hard circuit board, the hard circuit board having a board body and a connecting tongue and being provided with a through hole;

configuring a disconnecting notch, the disconnecting notch configured at the board body such that the board body is separated by the disconnecting notch into two floating plates arranged side by side at an interval and floatable using the disconnecting notch;

providing a fixing column, the fixing column being arranged on the main circuit board and having a fixing hole; and providing at least two connectors, the connectors respectively fixed to the floating plates;

wherein the hard circuit board is fixed to the main circuit board by a fixing element via the through hole, the fixing element is fixedly connected to the fixing hole via the through hole, the hard circuit board is fixed between the fixing element and the fixing column, and the hard circuit board is correspondingly plugged with the card edge connector by the connecting tongue.

* * * * *